US012558194B2

(12) United States Patent
Jackson et al.

(10) Patent No.: US 12,558,194 B2
(45) Date of Patent: Feb. 24, 2026

(54) ORTHODONTIC BRACKETS, SYSTEMS, AND METHODS

(71) Applicant: The University of North Carolina at Chapel Hill, Chapel Hill, NC (US)

(72) Inventors: Christina Jackson, Chapel Hill, NC (US); Ching-Chang Ko, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 446 days.

(21) Appl. No.: 16/481,299

(22) PCT Filed: Jan. 26, 2018

(86) PCT No.: PCT/US2018/015515
§ 371 (c)(1),
(2) Date: Jul. 26, 2019

(87) PCT Pub. No.: WO2018/140771
PCT Pub. Date: Aug. 2, 2018

(65) Prior Publication Data
US 2021/0128277 A1 May 6, 2021

Related U.S. Application Data

(60) Provisional application No. 62/451,343, filed on Jan. 27, 2017.

(51) Int. Cl.
*A61C 7/16* (2006.01)
*A61C 7/00* (2006.01)
(Continued)

(52) U.S. Cl.
CPC ................ *A61C 7/16* (2013.01); *A61C 7/002* (2013.01); *A61C 7/145* (2013.01); *A61C 7/282* (2013.01);
(Continued)

(58) Field of Classification Search
CPC ........... A61C 7/287; A61C 7/12; A61C 7/143; A61C 7/00; A61C 7/002
See application file for complete search history.

(56) References Cited

U.S. PATENT DOCUMENTS

| | | | | | |
|---|---|---|---|---|---|
| 4,243,386 | A | * | 1/1981 | Kawaguchi | A61C 7/16 433/9 |
| 4,369,033 | A | * | 1/1983 | Webb | A61C 7/16 433/9 |

(Continued)

FOREIGN PATENT DOCUMENTS

| | | |
|---|---|---|
| CN | 2569758 Y | 9/2003 |
| CN | 201131812 Y | 10/2008 |

(Continued)

OTHER PUBLICATIONS

European Office Action for Application No. 18744412.0 dated Oct. 28, 2021.

(Continued)

*Primary Examiner* — Eric J Rosen
*Assistant Examiner* — Sydney J Pulvidente
(74) *Attorney, Agent, or Firm* — KDW FIRM PLLC

(57) ABSTRACT

Orthodontic brackets are disclosed. An orthodontic bracket is formed such that the body and mesh portions are formed integrally in one piece, and the tooth-side mounting surface includes bonding elements that have an undercut angle to the mounting surface. The bonding elements can further include geometry to facilitate the spreading of bonding material. In some aspects, the bracket can also comprise elements for wire-mounting and aligner tray interaction. A system and methods of treatment are further disclosed. The bracket can be customized for an individual patient.

20 Claims, 8 Drawing Sheets

(51) Int. Cl.

| | | |
|---|---|---|
| *A61C 7/14* | (2006.01) |
| *A61C 7/28* | (2006.01) |
| *A61C 9/00* | (2006.01) |
| *B33Y 10/00* | (2015.01) |
| *B33Y 50/02* | (2015.01) |
| *B33Y 80/00* | (2015.01) |

(52) U.S. Cl.

CPC ............ *A61C 9/0046* (2013.01); *B33Y 10/00* (2014.12); *B33Y 50/02* (2014.12); *B33Y 80/00* (2014.12)

(56) References Cited

U.S. PATENT DOCUMENTS

| | | | | |
|---|---|---|---|---|
| 4,529,382 | A * | 7/1985 | Creekmore .............. | A61C 7/12 433/9 |
| 4,843,513 | A * | 6/1989 | Edris ........................ | H02H 7/06 361/107 |
| 4,856,991 | A * | 8/1989 | Breads ................... | A61C 7/125 433/24 |
| 4,936,773 | A * | 6/1990 | Kawaguchi .............. | A61C 7/12 433/8 |
| 5,030,089 | A * | 7/1991 | Kawaguchi .............. | A61C 7/12 433/18 |
| 5,095,602 | A * | 3/1992 | Reher ................ | A61C 13/0016 451/910 |
| 5,711,666 | A * | 1/1998 | Hanson .................... | A61C 7/30 433/11 |
| 5,975,893 | A * | 11/1999 | Chishti ................... | A61C 9/00 |
| 6,015,289 | A * | 1/2000 | Andreiko .............. | A61C 7/002 433/24 |
| 11,633,262 | B2 * | 4/2023 | Albert .................... | A61C 7/287 433/11 |
| 11,730,570 | B2 * | 8/2023 | Lenzner ................. | A61C 7/148 433/10 |
| 2002/0110774 | A1 | 8/2002 | Abels et al. | |
| 2003/0152884 | A1 | 8/2003 | Wiechmann et al. | |
| 2003/0190577 | A1 | 10/2003 | Shin et al. | |
| 2004/0013994 | A1 | 1/2004 | Goldberg et al. | |
| 2004/0121278 | A1 * | 6/2004 | Kelly ...................... | A61C 7/282 433/9 |
| 2005/0019719 | A1 | 1/2005 | Hanson | |
| 2005/0026102 | A1 | 2/2005 | Miller | |
| 2005/0271996 | A1 * | 12/2005 | Sporbert ................. | A61C 7/00 433/24 |
| 2006/0008761 | A1 | 1/2006 | Allred | |
| 2006/0166159 | A1 * | 7/2006 | Abels .................... | A61C 9/004 433/8 |
| 2006/0246392 | A1 | 11/2006 | Vigolo | |
| 2007/0111152 | A1 * | 5/2007 | Primus .................... | A61C 7/16 433/9 |
| 2007/0178422 | A1 * | 8/2007 | Voudouris ............ | B23K 26/359 433/10 |
| 2008/0085486 | A1 * | 4/2008 | Busch ...................... | A61C 7/16 433/24 |
| 2008/0113311 | A1 | 5/2008 | Forster | |

| | | | | |
|---|---|---|---|---|
| 2008/0138756 | A1 | 6/2008 | Lim et al. | |
| 2008/0213718 | A1 | 9/2008 | Abels et al. | |
| 2009/0169841 | A1 * | 7/2009 | Abels .................... | C04B 35/634 428/206 |
| 2010/0055637 | A1 * | 3/2010 | Rodriguez ............. | A61C 7/287 264/16 |
| 2011/0086323 | A1 * | 4/2011 | Wessinger ............... | A61C 7/14 433/11 |
| 2011/0143299 | A1 * | 6/2011 | Foerster ................. | A61C 7/023 433/4 |
| 2011/0189623 | A1 * | 8/2011 | Moon .................... | A61C 7/287 433/9 |
| 2011/0287378 | A1 * | 11/2011 | Dupray .................. | A61C 7/285 433/9 |
| 2011/0318699 | A1 * | 12/2011 | Forster .................... | A61C 7/287 433/10 |
| 2012/0288816 | A1 | 11/2012 | Dupray et al. | |
| 2013/0236847 | A1 * | 9/2013 | Shin ........................ | A61C 7/16 433/9 |
| 2015/0037747 | A1 * | 2/2015 | Choi ........................ | A61C 7/14 29/896.11 |
| 2015/0044625 | A1 * | 2/2015 | Lai ........................... | A61C 7/12 433/24 |
| 2015/0099237 | A1 * | 4/2015 | Owen .................... | A61C 7/145 433/8 |
| 2016/0287356 | A1 * | 10/2016 | Bernstein ............... | A61C 7/282 |

FOREIGN PATENT DOCUMENTS

| | | | | |
|---|---|---|---|---|
| CN | 201609422 | U | 10/2010 | |
| CN | 202136432 | U | 2/2012 | |
| CN | 102727316 | A | 10/2012 | |
| CN | 103445872 | A | 12/2013 | |
| EP | 0658335 | * | 3/1994 | |
| EP | 658335 | A1 * | 6/1995 | ............. A61C 7/282 |
| EP | 0658335 | B1 * | 7/1999 | ............. A61C 7/282 |
| EP | 1350482 | A1 | 10/2003 | |
| RU | 2543543 | C2 | 3/2015 | |
| WO | WO 2004/004592 | A1 | 1/2004 | |
| WO | WO 2008/119119 | A1 | 10/2008 | |
| WO | WO 2009/141825 | A2 | 11/2009 | |
| WO | WO-2015164462 | A1 * | 10/2015 | ............... A61C 7/30 |
| WO | WO 2018/140771 | A1 | 8/2018 | |

OTHER PUBLICATIONS

Chinese Office Action for Application No. 202111107644 dated Jul. 25, 2022.

Chinese Office Action for Application No. 202111107644 dated Feb. 5, 2023.

Chinese Office Action for Application No. 201880008482.1 dated May 7, 2021.

European Search Report for Application No. 18744412.0 dated Sep. 25, 2020.

Chinese Office Action for Application No. 201880008482.1 dated Nov. 13, 2020.

International Search Report and Written Opinion for Application No. PCT/US2018/015515 dated Apr. 19, 2018.

* cited by examiner

Patient

ORTHODONTIC BRACKETS, SYSTEMS, AND METHODS

CROSS-REFERENCE TO RELATED APPLICATIONS

This patent application claims priority to U.S. Provisional Patent Application Ser. No. 62/451,343, filed on Jan. 27, 2017, the content of which is incorporated by reference herein in its entirety.

TECHNICAL FIELD

This application is directed toward the field of orthodontics.

BACKGROUND

Orthodontic systems and methods have been in use for many years to correct dental alignment. The use of orthodontic devices may be prescribed for medical and/or aesthetic reasons, and intervention may range from minimally invasive to long-term comprehensive treatment. Conventional methods typically begin with adhering a composite material to the surface of a tooth and using various means to encourage tooth movement. One such method consists of bonding metal brackets to the outer side of the composite material at prescribed angles and connecting the brackets with a tensioning wire (known as an "archwire") to create an aligning force.

While this treatment has proven very effective, some drawbacks remain. For example, conventional metal brackets are typically constructed in a multi-process method. This method may include molding the front bracket portion and stamping or sintering a separate "mesh" or mounting area to the tooth side of the bracket. Due to the small size of the parts, it is difficult to create reproducible, high-quality brackets with tight tolerance specifications. A common production issue is variation in the size of the slot for receiving the archwire. This can have a negative effect on the resulting alignment force, causing the bracket to move the tooth in an unintended way. Additionally, the slot for the wire typically has a flat base, while the wire attempts to follow a curved path around the patient's teeth. This causes friction between the wire and the bracket slot, which can possibly lead to binding or notching of the wire. This can reduce the effectiveness of the treatment.

A primary limitation of traditional lingual brackets is that engagement of the archwire into the bracket is extremely difficult and time-consuming. Similarly, a limitation of using clear aligners alone is the efficacy and accuracy of the alignment stage. Composite attachments for clear aligners are very technique-sensitive to apply. They do not always fit the aligners due to errors made during application to the teeth, resulting in unideal final tooth position. When final tooth position is not ideal, a "refinement" phase must begin, which requires a new scan, new attachments, and new aligners.

Additionally, orthodontic brackets can be applied to either the facial surface or the lingual surface of the teeth. While lingual attachments are sometimes desirable for aesthetic reasons, there are challenges in the placement and comfort of this type of bracket. Thus, for both facial and lingual brackets, there is a need for improved geometry, manufacturing reproducibility, and accuracy and ease of placement.

SUMMARY

The subject matter disclosed herein relates to orthodontics, specifically a method of producing metal brackets for use therein, a bracket produced by this method, and a system and method of using such brackets in an orthodontic treatment. With an orthodontic bracket as disclosed herein, improved elements for facial and lingual bracket are provided. An integrally formed construction allows the use of smaller, lower profile brackets that are more comfortable to the patient, while still providing multiple therapeutic features and retention elements.

In one aspect, an orthodontic bracket as disclosed herein can have a mounting portion and a treatment portion formed integrally in one part, where the mounting portion has a mounting surface for attachment to a tooth and at least one bonding element configured to receive a bonding material, and the treatment portion has at least one wire-mounting element wherein the at least one bonding element is disposed at an undercut angle with respect to the mounting surface.

According to another aspect of the subject matter disclosed herein, a method of orthodontic treatment using the disclosed one-piece bracket is described. The method is adapted to utilize the lingual surfaces of the teeth and is a combination of clear aligner and archwire therapy.

The method disclosed herein overcomes obstacles of the prior art. For example, replacing the composite attachments with custom metal attachments not only reduces the user error during application; the fit with the aligner is perfected since the attachments are in place at the time of scanning. The provider can easily engage the lingual archwire into the custom metal attachment, and by combining archwire alignment with clear aligners, the effectiveness and efficiency of the treatment time will be improved and the ideal results will be more easily obtained.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

The subject matter disclosed herein addresses problems encountered in a traditional method of orthodontic treatment using conventional brackets. By providing an integrally made orthodontic bracket with features disclosed herein, orthodontic treatment can be customized for each individual patient. Custom orthodontic brackets and attachments improve orthodontic outcomes and reduce treatment time by optimizing the interactions between the bracket, the wire, and the tooth.

Figure 1A:
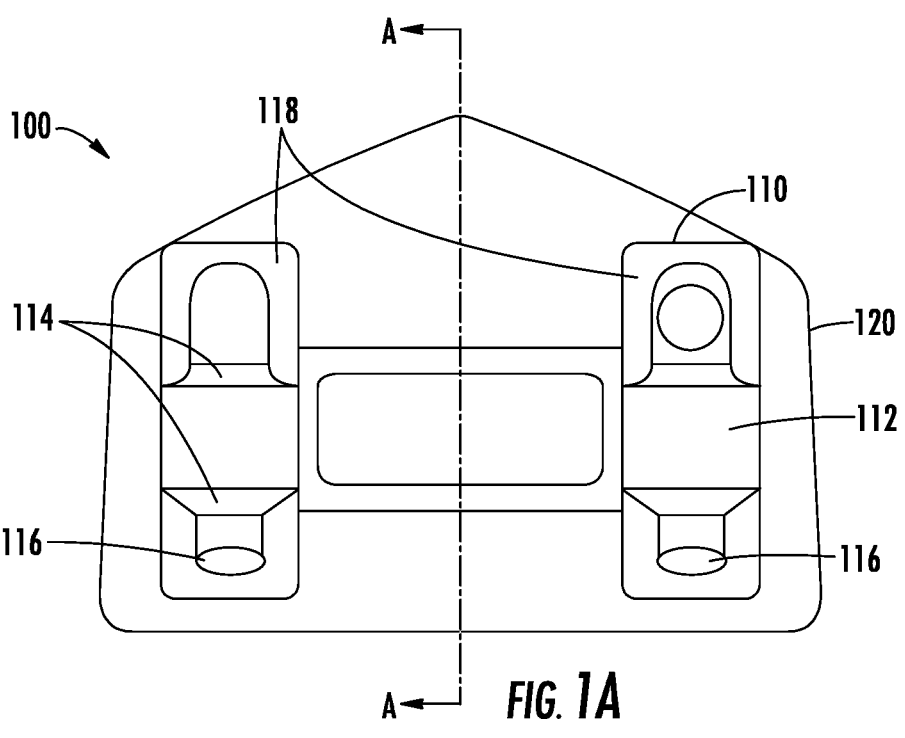
FIG. 1A is a front view of an orthodontic bracket according to the disclosure herein.
Figure 1B:
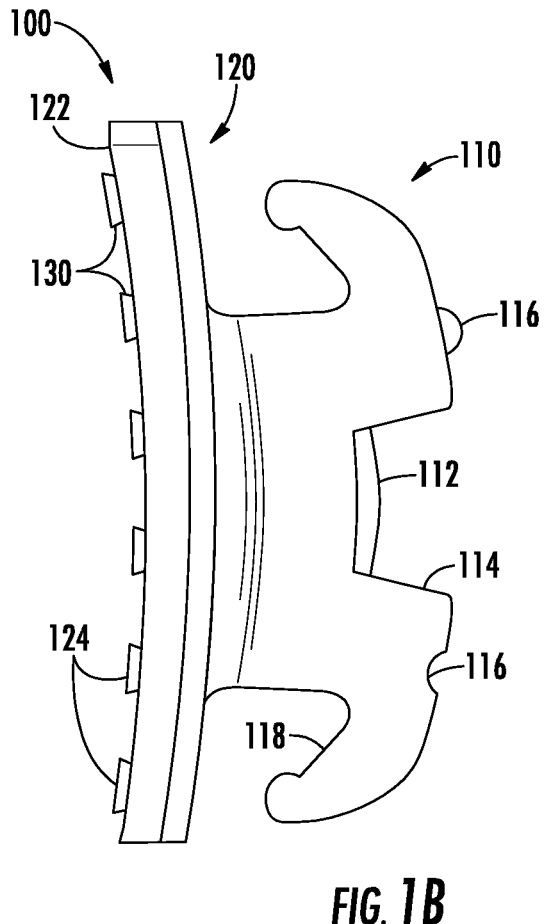
FIG. 1B is a cross-sectional side view drawn along line A-A of FIG. 1A.
Figure 1C:
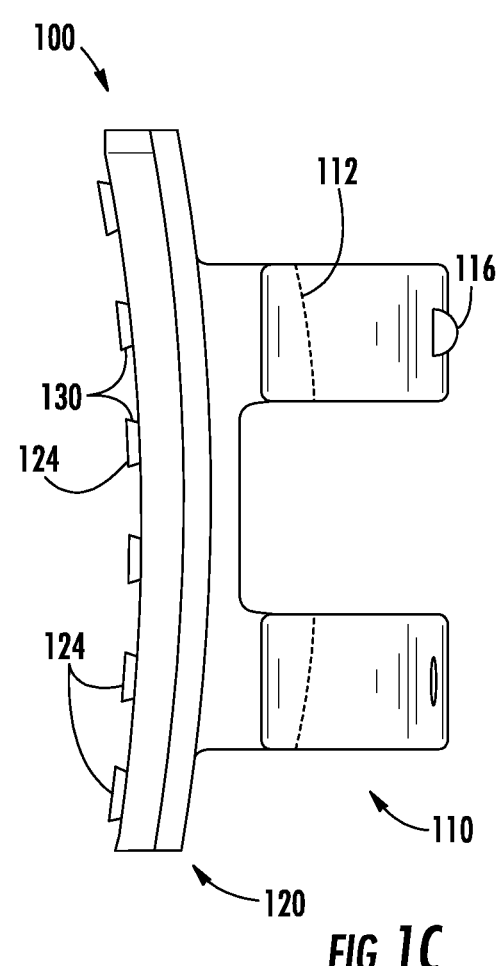
FIG. 1C is a top view of an orthodontic bracket according to the disclosure herein.

Referring to FIGS. 1A-1C, an example embodiment of an orthodontic bracket, generally designated 100, is depicted wherein bracket 100 is configured for attachment, such as lingual or facial attachment, to a portion of a tooth with or without completely encircling the tooth. Orthodontic bracket 100 has two general regions: a treatment portion 110 and a mounting portion 120. Treatment portion 110 is also conventionally referred to as a body. Mounting portion 120 generally corresponds to a conventional "mesh" portion of an orthodontic bracket, which is typically manufactured as a separate part from the body and later joined to the body. According to the disclosure herein, orthodontic bracket 100 is formed as a single part, with treatment portion 110 and mounting portion 120 integrally joined. Treatment portion 110 has features for attaching treatment devices, such as bosses, hooks, and slots. Mounting portion 120 has a tooth-side mounting surface 122, which features for facilitating attachment to a tooth with a bonding material (e.g., curable composite). Mounting portion 120 further includes at least one bonding element, which can be in the form of a protrusion or a recession (e.g., 124, 126). This protrusion or recession is disposed at least in part at an undercut angle relative to the mounting surface to form an undercut such as undercut 130. In other words, the bonding element joins the mounting surface at an angle less than perpendicular. These features are discussed in further detail below.

Treatment portion 110 can further comprise archwire slot 112 and tiewings 118, on which can be mounted elastic ligatures to retain an archwire. The geometry of archwire slot 112 can be customized to accommodate various archwires. In the example embodiment of orthodontic bracket 100, slot 112 has tapered walls 114. However, other profiles can be envisioned, for example, walls 114 can have a rectangular or arc-shaped profile to match the geometry of a particular archwire. Additionally, the base of slot 112 is preferably formed a longitudinal arc shape in the wire direction to follow the curvature of a patient's dentition. Orthodontic bracket 100 can further optionally comprise additional features 116 in the form of bosses, slots, etc., which can be used for functions such as bracket orientation and additional treatment device interfaces.

Figures 2, 3, 4:
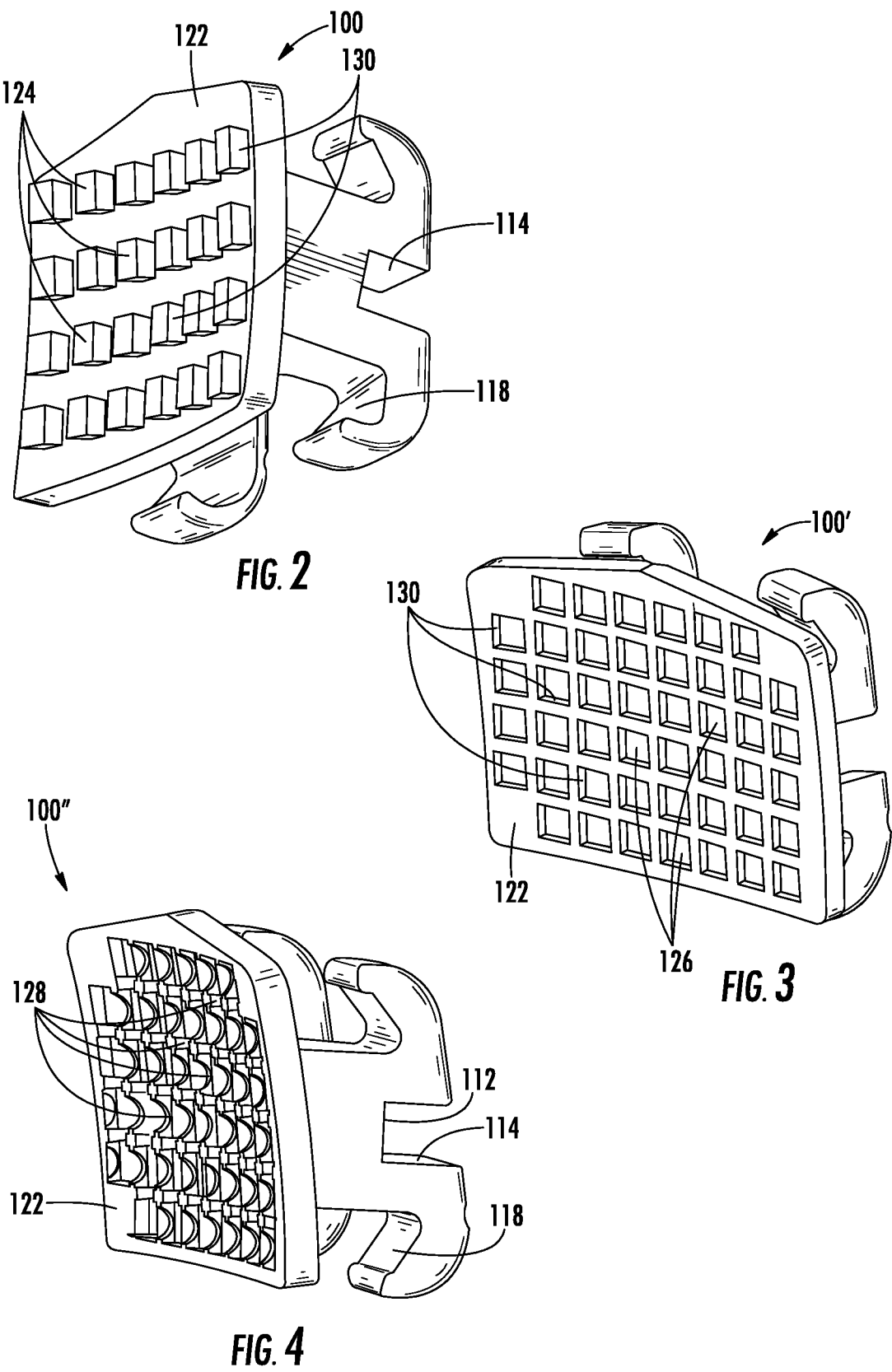
FIG. 2 is a rear isometric view of an orthodontic bracket according to the disclosure herein.
FIG. 3 is a rear oblique view of an orthodontic bracket according to the disclosure herein.
FIG. 4 is another isometric view of an orthodontic bracket according to the disclosure herein.

FIG. 2 is an isometric view of orthodontic bracket 100 as seen from the tooth-facing side, wherein bracket 100 is configured for attachment to a portion of a tooth with or without completely encircling the tooth. As depicted here, orthodontic bracket 100 has a plurality of bonding pedestals 124, which are disposed at a level above mounting surface 122. In this example embodiment, bonding pedestals 124 are disposed in a grid array; however, other configurations are also possible, such as circular or random patterns, or even a single element. Each bonding pedestal 124 is preferably attached to mounting surface 122 at an angle less than 90° with respect to mounting surface 122 to form undercut 130.

In the embodiment shown in FIGS. 1B-1C, bonding pedestal 124 has undercut 130 on all four sides of the pedestal. However, it is also possible to have undercut 130 on one, two, or three sides of the pedestal. This geometry provides an improved interface between the bonding material and the bracket by providing an increased volume for the composite to flow into as compared to conventional brackets. This can also be helpful in resisting separation from the tooth after the composite hardens by creating a mechanical interlock.

FIG. 3 depicts an alternate embodiment of orthodontic bracket 100, generally designated 100', wherein bracket 100' is configured for attachment to a portion of a tooth with or without completely encircling the tooth. In this embodiment, the bonding elements of mounting surface 122 are in the form of bonding recesses 126. Bonding recesses 126 are disposed at an angle relative to mounting surface 122 to form undercut 130. I.e., in embodiments using bonding recesses 126, the lower or inner surface of the recess has a greater area than the outer surface of the recess. As with bonding pedestal 124, bonding recess can have undercut 130 on one, two, three, or all four sides. For both bonding pedestals 124 and bonding recesses 126, the bonding elements can be a square shape with outer side lengths of approximately 200-400 μm and a depth of approximately 100-350 μm. It is to be understood that other shapes are also possible.

To achieve undercut 130 in bonding pedestal 124 or bonding recess 126, orthodontic bracket 100 can be produced by various, suitable processes known to those skilled in the art. Current methods include additive manufacturing processes such as powder bed fusion such as selective laser sintering (SLS) and direct metal laser sintering (DMLS), and powder fed such as directed energy deposition (DED). This construction allows the inclusion of features in the bracket that are difficult to obtain using conventional techniques. This also allows an orthodontic bracket to be designed and built at the point of service (i.e., "chairside") and customized for an individual patient. An additional benefit of a single part construction is that designing and fabricating the bracket chairside reduces the high tooling and fabrication costs often associated with changes to bracket design. Yet further advantages of the bracket disclosed herein are improved dimensional tolerances, faster production, and more desirable aesthetics.

FIG. 4 depicts another alternative embodiment of orthodontic bracket 100, generally designated 100", wherein bracket 100" is configured for attachment to a portion of a tooth with or without completely encircling the tooth. In addition to bonding recesses 126, orthodontic bracket 100" also has optional grooves 128. Grooves 128 can be disposed longitudinally and/or laterally with respect to the horizontal plane of the bracket. Grooves 128 provide an additional path for even distribution of bonding material in bonding recesses 126.

Figures 5A, 5B, 6:
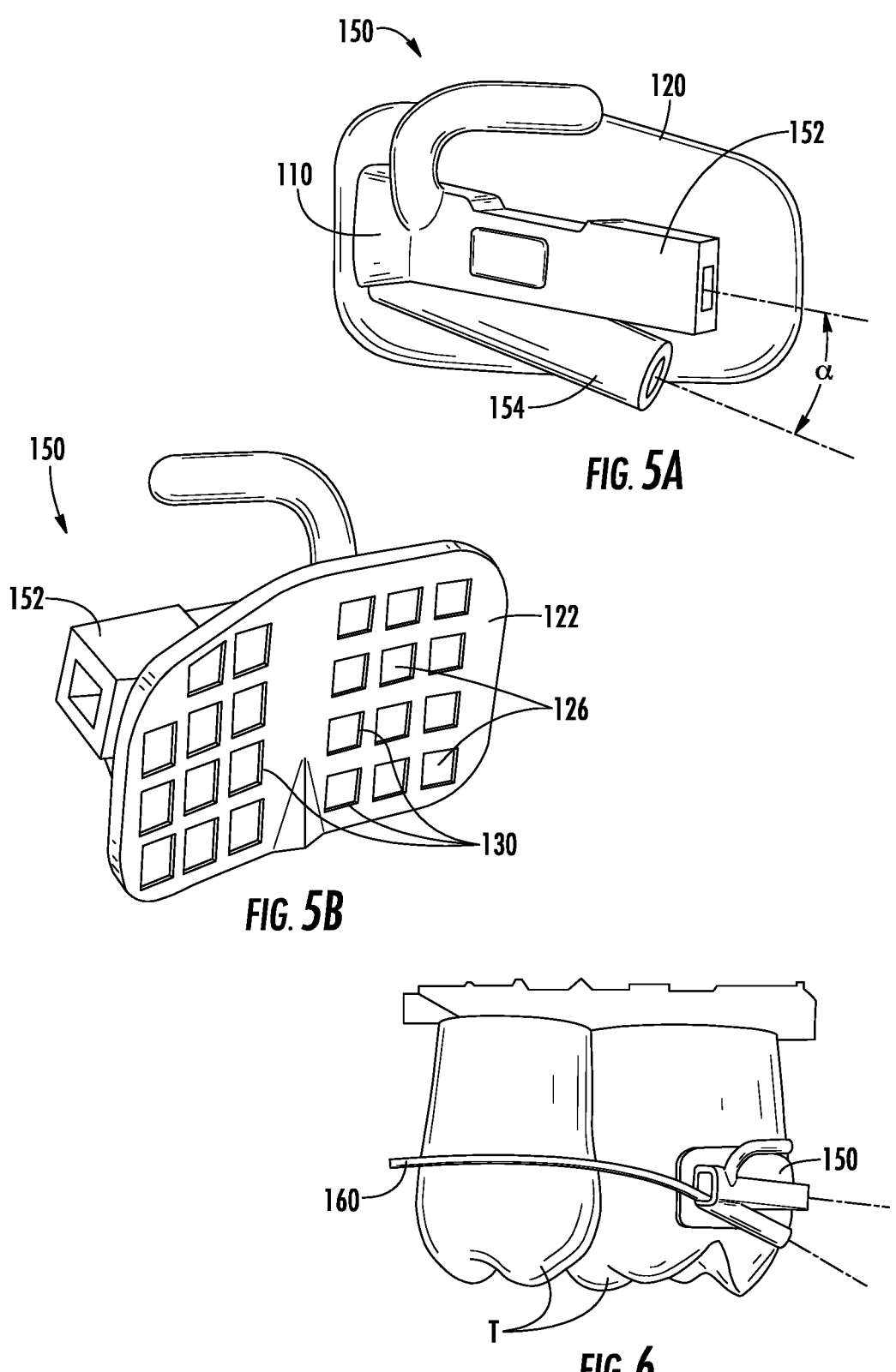
FIGS. 5A-5B are isometric views of another embodiment of an orthodontic bracket according to the disclosure herein.
FIG. 6 is an installed view of an orthodontic bracket according to the disclosure herein.
Figure 7A:
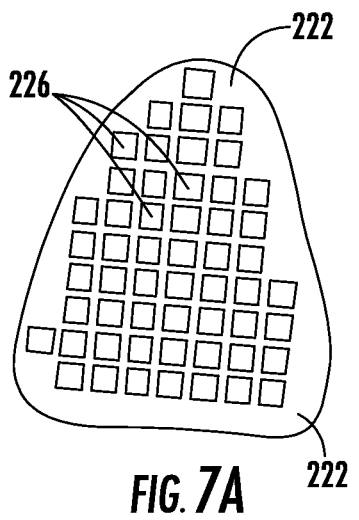
FIGS. 7A-7E are various views of another embodiment of an orthodontic bracket according to the disclosure herein.
Figure 7B:
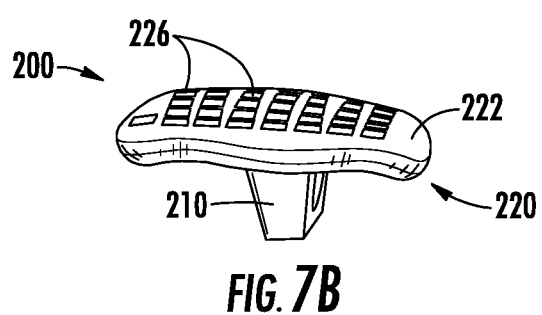
Figure 7C:
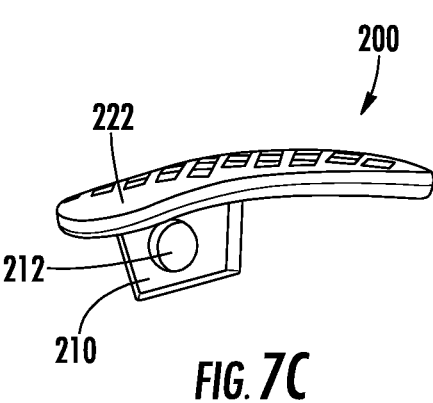
Figure 7D:
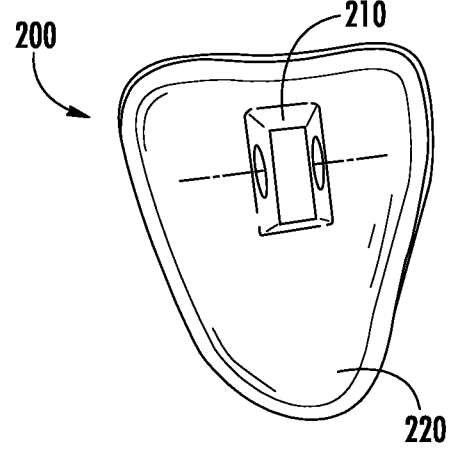
Figure 7E:
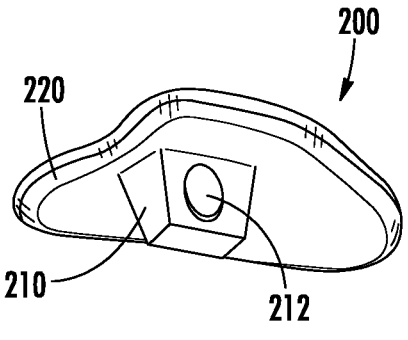

FIGS. 5A-5B illustrate another embodiment of an orthodontic bracket generally designated 150, wherein bracket 150 is configured for attachment to a portion of a tooth with or without completely encircling the tooth. Orthodontic bracket 150 includes a treatment portion 110, mounting portion 120, and bonding recesses 126 disposed at a negative or undercut angle to form undercut 130. Instead of tiewings, the treatment portion 110 of orthodontic bracket 150 is a tube-shaped element 152 for inserting an archwire. Brackets of this type are used, for example, at a terminal end of an archwire. Orthodontic bracket 150 also includes an optional second wire tube 154. Second wire tube 154 is preferably disposed at an angle α in the range of 10-45° from the occlusal plane.

FIG. 6 illustrates a usage case for orthodontic bracket 150. Second wire tube 154 can be used as an alternative path for archwire 160, for the purpose of producing a distal crown moment in a molar. This distal crown moment counteracts the mesial crown moment produced when aligning teeth T and protracting molars forward during space closure. The balanced moments can aid in keeping in the molar in place while retracting anterior teeth, which is a very desirable biomechanical movement in treating patients with spacing or extractions. Although the embodiment described herein uses a one-piece construction, it is envisioned that second wire tube 154 can also be used with a conventional banded mounting type that completely encircles the tooth.

Routing an archwire through second wire tube 154 provides advantages over the traditional technique of bonding a bracket at an angle on the tooth. Second wire tube 154 can allow the dental provider to make significant adjustments to the archwire tension without having to remove and re-bond the bracket.

FIGS. 7A-7E show yet another example embodiment of an orthodontic bracket, generally designated 200, wherein bracket 200 is configured for attachment to a portion of a tooth with or without completely encircling the tooth. Orthodontic bracket 200 has treatment portion 210 and mounting portion 220. Whereas orthodontic bracket 100 is configured such that mounting surface 122 is generally concave (i.e., suitable for mounting on a facial surface), orthodontic bracket 200 is configured such that mounting surface 222 is convex in some cases and is configured for mounting on a lingual surface of a tooth. Various embodiments of orthodontic bracket 200 can be used as a system in a lingual orthodontic treatment, such as with archwires, aligner trays, or a combination thereof.

As with orthodontic bracket 100, orthodontic bracket 200 is formed integrally as one part. This advantageously allows orthodontic bracket 200 to be produced with small features and overall size that provides improved comfort to a patient and ease of archwire insertion by the clinician. Additionally, if orthodontic bracket 200 is produced by an additive manufacturing process at the point of service, mounting surface 222 customized to individual tooth anatomy.

Similarly to orthodontic bracket 100', orthodontic bracket 200 includes bonding elements to facilitate the adhesion of bonding material to the bracket. For example, mounting surface 222 includes a number of bonding recesses 226, which can be provided with dimensions as described for bonding recesses 126. Bonding recesses 226 can be arranged in a regular, semi-regular, or random pattern as necessary to maximize bonding.

In the example embodiment shown in FIGS. 7A-7E, treatment portion 210 differs from the treatment portions in orthodontic brackets 100 and 150. In the case of orthodontic bracket 200, a through-hole 212 is provided. Through-hole 212 is located between the mounting portion and the treatment portion and is configured to receive an archwire. The diameter of the through-hole corresponds to the size of a round archwire (e.g., a round, superelastic archwire) for connecting lingual brackets. Treatment portion 210 can also be used as part of a clear alignment therapy, which is described in more detail below.

Figures 8, 9, 10:
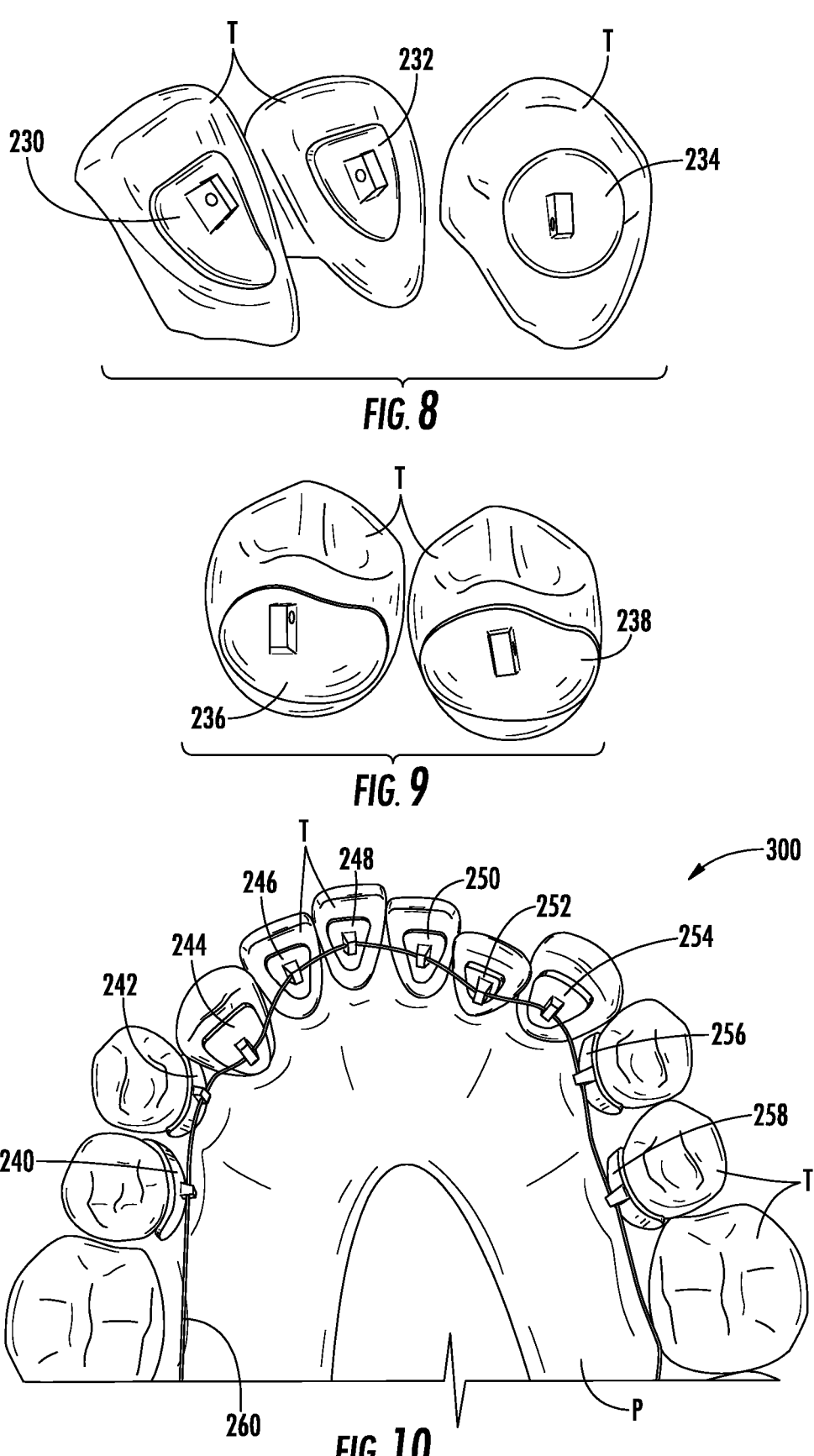
FIGS. 8 and 9 are installed views of orthodontic brackets according to the disclosure herein.
FIGS. 10-12 are top isometric views of an orthodontic system used for teeth according to the disclosure herein.

The overall shape of mounting portion 220 can be produced in virtually any shape as required to match the contours of a tooth. FIGS. 8 and 9 illustrate possible embodiments for lingual brackets. For example, FIG. 8 depicts lingual brackets 230, 232, 234 mounted on incisor and canine teeth T. In this case, the mounting portions are generally convex and configured to fit the lingual surface of the teeth. In FIG. 9, on the other hand, lingual brackets 236 and 238 are shown mounted on molar teeth T, and the mounting portion in this case has a generally concave shape. It can also be seen in FIGS. 8 and 9 that the axes of adjacent through-holes are not aligned; the insertion of a lingual archwire (e.g., an archwire made of a shape-memory alloy) produces aligning forces to cause movement in the teeth.

Referring now to FIG. 10, a system of lingual brackets 300, including individual brackets 240, 242, 244, 246, 248, 250, 252, 254, 256, 258 and an archwire 260 is shown in the mouth of a patient P. Here it can be seen that each bracket is customized for each individual tooth T and that the brackets have a low profile. Additionally, the lingual brackets can be quickly mounted in the mouth of patient P with the use of an indirect bonding tray. Accordingly, the system of lingual brackets 300 can provide a comfortable and minimally-intrusive treatment. It can additionally be seen in FIG. 10 that some of the brackets have mounting portions with convex curvatures (e.g., 246, 248, 250), while others have a more concave form (e.g., 256, 258).

Figure 11:
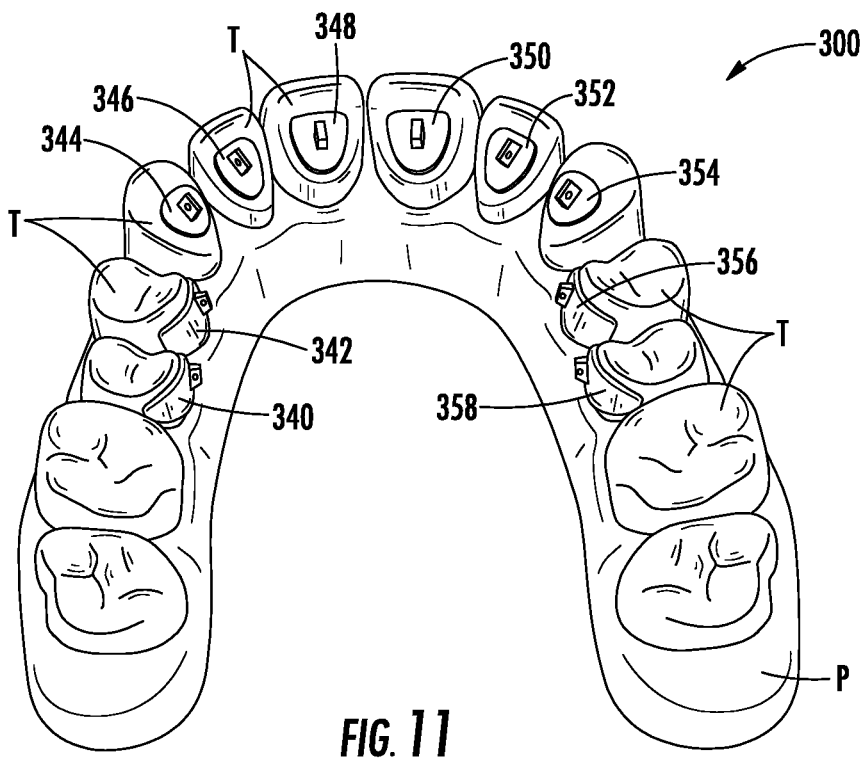
Figure 12:
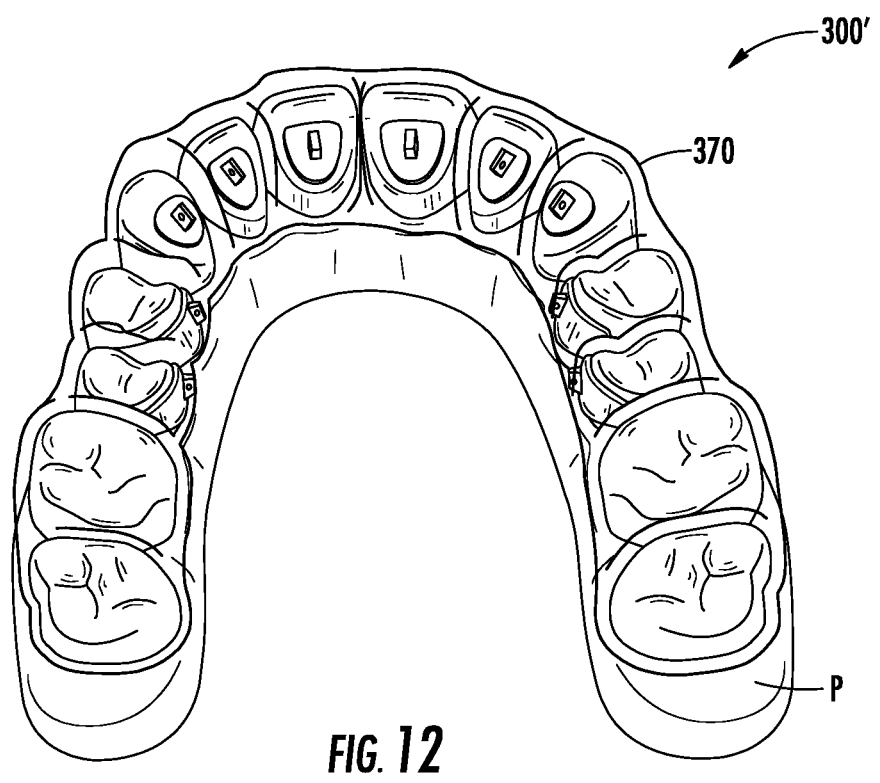

FIGS. 11 and 12 depict an alternate embodiment of system 300, generally designated 300'. System 300' (including brackets 340, 342, 344, 346, 348, 350, 352, 354, 356, 358 that are each configured for attachment to a portion of a tooth with or without completely encircling the tooth) presents a hybrid approach to lingual orthodontic treatment. For example, system 300' can be applied to the teeth T as shown in FIG. 11. Each bracket comprises a mounting portion with bonding elements and a treatment portion with a through-hole. In an initial treatment stage, brackets 340 to 358 can, for example, be connected using an archwire (not shown). After a certain degree of alignment has been achieved, the archwire is then removed and clear alignment therapy begins. The archwire is replaced with clear aligner tray 370, as seen in FIG. 12. Conventionally, clear aligner trays interact with ridges that are adhered to the patient's teeth. The treatment portion of the lingual brackets in system 300' replace these ridges and provide the interaction with clear aligner tray 370 to move the teeth the final desired position.

Figure 13:
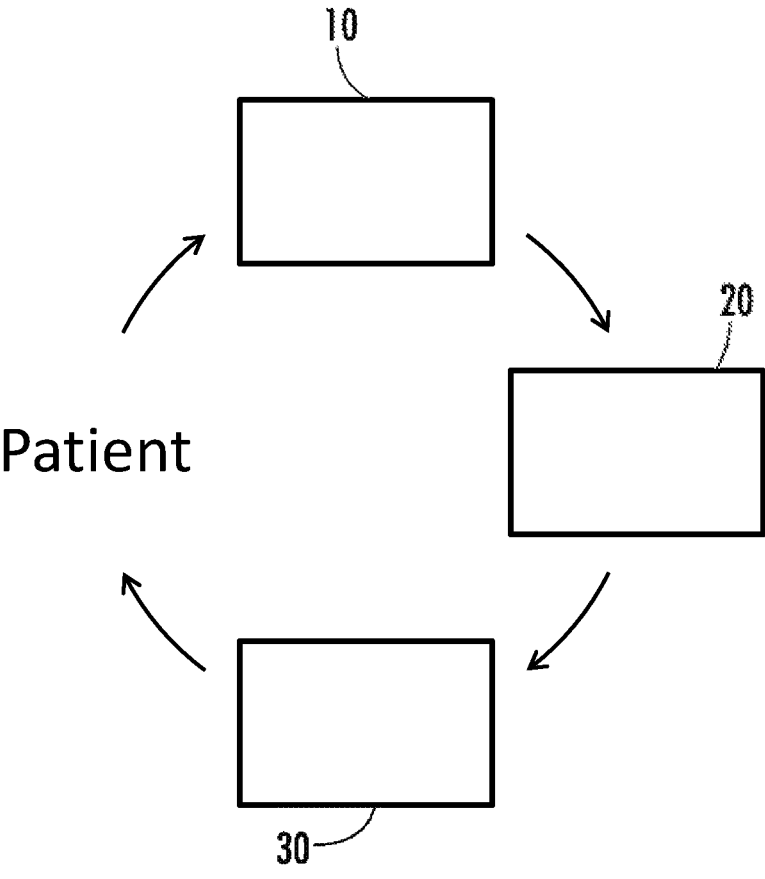
FIG. 13 is a schematic diagram of a method of orthodontic treatment according to the disclosure herein.
Figure 14:
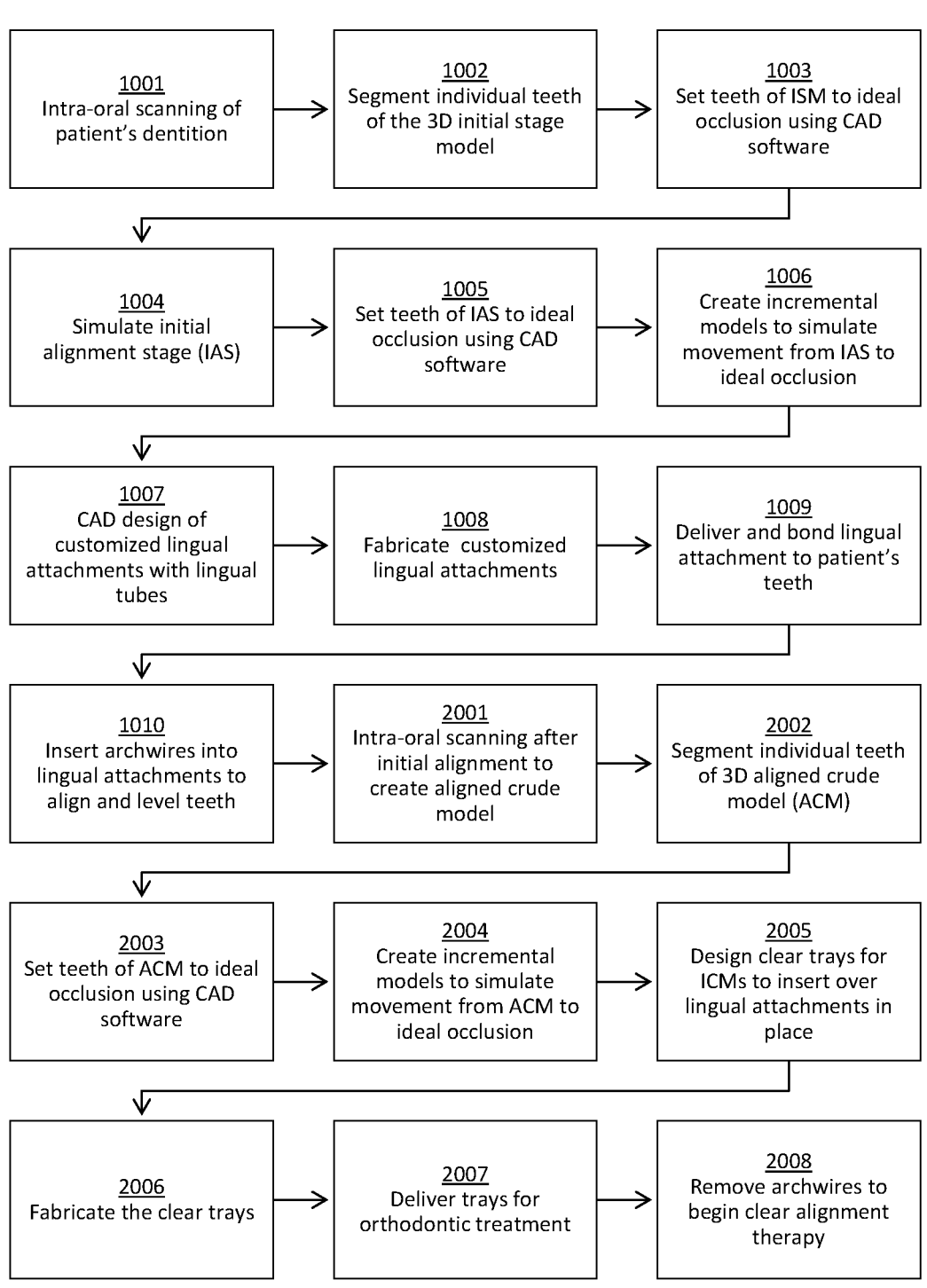
FIG. 14 is a flow chart of a method of orthodontic treatment according to the disclosure herein.

This general hybrid approach is adapted to a unique method of treatment in accordance with the disclosure herein and described in the schematic diagram of FIG. 13 and the flow chart of FIG. 14. This treatment can achieve a desired dental alignment in two procedural stages. The first stage (Stage 1) moves a patient's teeth into partial alignment by using a system of orthodontic brackets, which is configured for lingual attachment and use with lingual archwires (e.g., 300). In the second stage (Stage 2), the alignment progress is measured and adjusted, and the brackets are used in conjunction with clear alignment therapy. Treatment may occur on either an upper or lower portion of the jaw, or both at the same time.

The treatment begins with an imaging scan of the inside of the patient's mouth (1001). This can be accomplished, for example, by using a laser scanner 10. The scanned image is sent to a 3D CAD program on a computer 20, where it is processed as required to separate the single image of the scanned teeth into separate, isolated elements (1002). The processed 3D model can be referred to as an initial stage model (ISM). The dental provider then uses skill and judgement to place the modeled tooth elements in a final desired state for that particular patient (e.g., improved bite, straight appearance, decreased crowding, etc.) (1003). This final state can be referred to as an ideal occlusion, and it can be based, for example, on biomechanical principles that match individual malocclusion. Next, a computer algorithm can be used to define a specific path for each tooth, in order to move the teeth from the initial location to the ideal occlusion. An intermediate state along the path is chosen as the end of Stage 1, which can be referred to as the initial alignment stage, or IAS (1004). A second simulation is then performed to move the teeth from the IAS to the ideal occlusion (1005). These paths are segmented into several discrete models that represent incremental states (1006). At this point, the dental provider can refer to the computer model to aid in the design of custom lingual brackets (e.g., similar to orthodontic bracket 200), which preferably have recessed bonding elements and through-holes in the treatment portion. The custom lingual brackets, also known as attachments, are configured to move the teeth from the initial alignment stage to the ideal occlusion (1007) with the aid of clear aligners.

The one-piece custom lingual brackets are then fabricated and delivered to the dental provider if necessary (1008). The custom lingual brackets can be produced by any appropriate method, for example, by using an additive manufacturing process on a 3D printer 30. The brackets are then loaded with adhesive (e.g., Transbond LV) on the mounting feature of the attachment. The attachments bonded to the patient's teeth in a manner to facilitate the movement of the teeth from the initial alignment stage to the ideal occlusion (1009). Lingual archwires, which are preferably shape memory alloy, are then inserted and used to align and level the patient's teeth for a time period, for example 3-6 months. The lingual archwires can be produced by any suitable method, include an additive manufacturing process. The end of this time frame is the end of Stage 1 (1010).

At the end of time period (for example 3-6 months), the patient's teeth will have moved partially toward the ideal occlusion. The patient's mouth is then scanned again, for example, by using a laser scanner 10 (2001), and the image is imported to a 3D CAD model on a computer 20 and processed to separate the teeth into individual elements (2002). The position of the teeth at this point can be referred to as the aligned crude model (ACM), which is targeted to be comparable to the ISM. The dental provider can then follow a process similar to Stage 1 by refining the ideal occlusion (2003) and using a computer algorithm to update and adjust the path from the ACM to the ideal occlusion. The path can be saved in incremental steps, also known as incremental step models, or ICM (2004). Each ICM defines a position for designing a series of clear alignment trays (2005). The clear alignment trays can then be constructed using any appropriate method (2006), including an additive manufacturing process using a 3D printer 30, and delivered to the dental provider for continued treatment (2007). The lingual attachments are left in place to serve as retentive points and to produce forces on the teeth in conjunction with the aligner trays in place of the conventional composite attachments. Using the treatment portions of the custom lingual brackets as the reaction points with the clear trays can advantageously provide a strong and accurate movement in the teeth.

Finally, the lingual archwires can be removed, and clear alignment therapy begins (2008). The series of trays are used in succession until the ideal occlusion is achieved. The patient's progress is monitored by the dental provider on a regular basis, and, if necessary, refinement trays can produced to correct alignment.

While several exemplary embodiments of the subject matter are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). For example, although the figures depict embodiments with mounting portions that do not encircle a tooth, it is also possible to provide orthodontic brackets according to the disclosure that completely encircle a tooth.

The subject matter disclosed herein can be implemented in or in association with software in combination with hardware and/or firmware. For example, the subject matter described herein can be implemented in software executed by a processor or processing unit, for example that is or are in or associated with computer 20. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method of orthodontic treatment, the method comprising:

scanning a patient's teeth with a 3D scanning machine to create a computer model of a patient's current dentition;

using a computer processor to model an ideal occlusion from the current dentition;

determining an initial alignment stage of the current dentition;

performing a computer simulation to virtually move the patient's teeth from the initial alignment stage to the ideal occlusion in incremental steps;

designing, using the computer processor, a plurality of custom lingual brackets which are configured to arrange the patient's teeth in the ideal occlusion;

wherein at least one or more or all of the custom lingual brackets comprise:

a mounting portion;

a treatment portion attached to the mounting portion; and a through-hole formed through the treatment portion, the through-hole being formed such that the through-hole is circumferentially-enclosed within the treatment portion, wherein the through-hole is disposed transverse to an exterior surface of the mounting portion;

fabricating the custom lingual brackets;

bonding the custom lingual brackets to the patient's teeth;

inserting at least one archwire into the custom lingual brackets to align and level the patient's teeth;

re-scanning the patient's teeth to create an aligned-crude model;

performing the computer simulation to create incremental alignment steps for moving the patient's teeth from the aligned-crude model to the ideal occlusion model;

designing, using the computer processor, one or more clear alignment trays for each incremental alignment step;

fabricating the one or more clear alignment trays, wherein the clear alignment trays are for orthodontic treatment; and after delivery of the one or more clear alignment trays:

removing the at least one archwire from the custom lingual brackets; and inserting a first alignment tray of the one or more clear alignment trays into the patient's mouth, the first alignment tray being inserted over the patient's teeth and the custom lingual brackets attached to the patient's teeth, such that the first alignment tray engages with the custom lingual brackets for moving the patient's teeth.

2. The method according to claim 1, wherein the at least one archwire is a round, superelastic archwire.

3. The method according to claim 1, wherein the at least one archwire is formed from shape-memory alloy material.

4. The method according to claim 1, wherein the at least one archwire is formed using an additive manufacturing process.

5. The method according to claim 1, wherein the custom lingual brackets are formed in one piece using an additive manufacturing process.

6. The method according to claim 1, wherein:

the mounting portion comprises:

a mounting surface for attachment to one of the patient's teeth; and bonding elements for receiving a bonding material; and the bonding elements are formed as protrusions above the mounting surface.

7. The method according to claim 1, wherein:

the mounting portion comprises:

a mounting surface for attachment to one of the patient's teeth; and bonding elements for receiving a bonding material; and the bonding elements are formed as recesses beneath the mounting surface.

8. The method according to claim 7, wherein the mounting surface comprises a plurality of grooves, the method comprising using the plurality of grooves to spread the bonding material through the plurality of recesses.

9. The method according to claim 8, wherein the mounting surface is formed to have a convex angle for mounting on a lingual side of one of the patient's teeth.

10. The method according to claim 1, comprising:

removing the first alignment tray from the patient's mouth; and inserting a second alignment tray of the one or more clear alignment trays into the patient's mouth, the second alignment tray being inserted over the patient's teeth and the custom lingual brackets attached to the patient's teeth, such that the second alignment tray engages with the custom lingual brackets for moving the patient's teeth.

11. A method of orthodontic treatment using orthodontic brackets, the method comprising:

providing the orthodontic brackets, each of which comprises:

a mounting portion comprising:

a mounting surface comprising a plurality of grooves; and a plurality of recesses, wherein each of the plurality of recesses has a square shape, is formed beneath the mounting surface and disposed at an undercut angle with respect to the mounting surface, such that each of the plurality of recesses joins the mounting surface at an angle less than perpendicular, and has an inner surface and an outer surface, the inner surface having a greater area than the outer surface;

wherein each of the plurality of grooves is formed in a sidewall that separates directly adjacent recesses of the plurality of recesses, each of the plurality of grooves being in a form of an arched passageway between such directly adjacent recesses; and a treatment portion comprising at least one wire-mounting element;

wherein the mounting portion and the treatment portion are formed integrally in one part;

attaching, using a bonding material, the orthodontic brackets to one or more teeth of a patient, wherein the bonding material is received within the plurality of recesses;

using the plurality of grooves to spread the bonding material through the plurality of recesses; and either:

inserting at least one archwire into the at least one wire-mounting element of the treatment portion; or attaching a clear alignment tray to the treatment portion.

12. The method of claim 11, wherein the at least one wire-mounting element comprises a slot with a curved base.

13. A method of orthodontic treatment, the method comprising:

scanning a patient's teeth with a 3D scanning machine to create a computer model of a patient's current dentition;

using a computer processor to model an ideal occlusion from the current dentition;

determining an initial alignment stage of the current dentition;

performing a computer simulation to virtually move the patient's teeth from the initial alignment stage to the ideal occlusion in incremental steps;

designing, using the computer processor, a plurality of custom lingual brackets configured to arrange the patient's teeth in the ideal occlusion, wherein a first set of the plurality of custom lingual brackets comprise:

a through-hole located between a mounting portion and a treatment portion, the through-hole being disposed transverse to an exterior surface of the mounting portion and circumferentially-enclosed within each of the custom lingual brackets of the first set of the plurality of custom lingual brackets;

wherein a second set of the plurality of custom lingual brackets has at least one custom lingual bracket, which comprises:

a mounting portion and a treatment portion formed integrally in one part;

the treatment portion comprising at least one a first tube-shaped wire-mounting element and a second tube-shaped wire-mounting element, which is disposed at an angle relative to the first tube-shaped wire-mounting element; and the mounting portion comprising a mounting surface for attachment to a tooth and at least one bonding element configured to receive a bonding material, wherein the at least one bonding element is disposed at an undercut angle with respect to the mounting surface;

fabricating each of the plurality of custom lingual brackets such that the mounting portion and the treatment portion are formed integrally in one part;

bonding each of the plurality of custom lingual brackets to the patient's teeth;

inserting at least one archwire into the through-hole of each of the first set of the plurality of custom lingual brackets and through the first or second tube-shaped wire-mounting element of each of the second set of the plurality of custom lingual brackets to align and level the patient's teeth;

re-scanning the patient's teeth to create an aligned-crude model;

performing a computer simulation to create incremental alignment steps for moving the patient's teeth from the aligned-crude model to the ideal occlusion model;

designing, using the computer processor, one or more clear alignment trays for each incremental alignment step;

fabricating the one or more clear alignment trays; and after delivery of the clear alignment trays:

removing the at least one archwire from the custom lingual brackets; and inserting a first alignment tray of the one or more clear alignment trays into the patient's mouth, the first alignment tray being inserted over the patient's teeth and the custom lingual brackets attached to the patient's teeth, such that the first alignment tray engages with the custom lingual brackets for moving the patient's teeth.

14. The method according to claim 13, wherein the at least one archwire is a round, superelastic archwire.

15. The method according to claim 13, wherein the at least one archwire is formed from shape-memory alloy material.

16. The method according to claim 13, wherein the at least one archwire is formed using an additive manufacturing process.

17. The method according to claim 13, wherein each of the plurality of custom lingual brackets are formed in one piece using an additive manufacturing process.

18. The method according to claim 13, comprising:

attaching each custom lingual bracket of the second set of the plurality of custom lingual brackets to a molar tooth of the patient; and inserting the archwire through the second tube-shaped wire-mounting element of one or more custom lingual bracket of the second set of the plurality of custom lingual brackets to produce a distal crown moment in each molar to which the one or more custom lingual bracket is attached.

19. The method according to claim 13, comprising:

removing the first alignment tray from the patient's mouth; and inserting a second alignment tray of the one or more clear alignment trays into the patient's mouth, the second alignment tray being inserted over the patient's teeth and the custom lingual brackets attached to the patient's teeth, such that the second alignment tray engages with the custom lingual brackets for moving the patient's teeth.

20. A method of orthodontic treatment, the method comprising:

scanning a patient's teeth with a 3D scanning machine to create a computer model of a patient's current dentition;

using a computer processor to model an ideal occlusion from the current dentition;

determining an initial alignment stage of the current dentition;

performing a computer simulation to virtually move the patient's teeth from the initial alignment stage to the ideal occlusion in incremental steps;

designing, using the computer processor, a plurality of custom lingual brackets which are configured to arrange the patient's teeth in the ideal occlusion;

wherein at least one or more or all of the custom lingual brackets comprise:

a mounting portion comprising a mounting surface and a plurality of recesses, the mounting surface comprising a plurality of grooves for spreading a bonding material through the plurality of recesses, wherein each of the plurality of grooves is formed in a sidewall that separates directly adjacent recesses of the plurality of recesses, each of the plurality of grooves being in a form of an arched passageway between such directly adjacent recesses;

a treatment portion attached to the mounting portion; and a through-hole formed through the treatment portion, the through-hole being formed such that the through-hole is circumferentially-enclosed within the treatment portion, wherein the through-hole is disposed transverse to an exterior surface of the mounting portion;

fabricating the custom lingual brackets;

using the plurality of grooves to spread the bonding material through the plurality of recesses;

bonding the custom lingual brackets to the patient's teeth;

inserting at least one archwire into the custom lingual brackets to align and level the patient's teeth;

re-scanning the patient's teeth to create an aligned-crude model;

performing the computer simulation to create incremental alignment steps for moving the patient's teeth from the aligned-crude model to the ideal occlusion model;

designing, using the computer processor, one or more clear alignment tray for each incremental alignment step; and fabricating the one or more clear alignment tray, wherein the clear alignment trays are configured for orthodontic treatment.

* * * * *